United States Patent
Block et al.

(10) Patent No.: US 7,677,089 B2
(45) Date of Patent: Mar. 16, 2010

(54) METHOD AND SYSTEM FOR TESTING THE OVERSPEED PROTECTION SYSTEM OF A TURBOMACHINE

(75) Inventors: Frederick William Block, Campobello, SC (US); Mark P. Bombard, Amsterdam, NY (US); Michael J. Dell'Anno, Clifton Park, NY (US); Guillermo Garcia, Kennesaw, GA (US); Eamon Patrick Gleeson, Atlanta, GA (US); Kenneth Lee Leary, Anderson, SC (US); Richard Lee Nichols, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 807 days.

(21) Appl. No.: 11/589,579

(22) Filed: Oct. 30, 2006

(65) Prior Publication Data

US 2008/0101918 A1    May 1, 2008

(51) Int. Cl.
*G01M 15/14*    (2006.01)
(52) U.S. Cl. .................................................. 73/112.01
(58) Field of Classification Search ............. 73/112.01, 73/112.02, 112.03, 112.04, 112.05, 112.06
See application file for complete search history.

(56) References Cited

U.S. PATENT DOCUMENTS

| | | | | |
|---|---|---|---|---|
| 3,986,364 A | * | 10/1976 | Cronin et al. | 60/706 |
| 4,019,390 A | * | 4/1977 | Smith et al. | 73/865.9 |
| 4,217,617 A | * | 8/1980 | Rossi et al. | 361/51 |
| 4,667,114 A | * | 5/1987 | Rossi | 290/40 A |
| 5,292,225 A | * | 3/1994 | Dyer | 415/29 |
| 7,100,354 B2 | * | 9/2006 | Opper | 60/39.091 |
| 7,355,828 B2 | * | 4/2008 | Jones | 361/51 |
| 2005/0193715 A1 | * | 9/2005 | Opper | 60/39.091 |
| 2007/0013365 A1 | * | 1/2007 | Jones | 324/160 |
| 2008/0101918 A1 | * | 5/2008 | Block et al. | 415/30 |
| 2008/0213084 A1 | * | 9/2008 | Rosenfield et al. | 415/30 |

* cited by examiner

*Primary Examiner*—Eric S McCall
(74) *Attorney, Agent, or Firm*—Dale J. Davis; Ernest G. Cusick; Frank A. Landgraff

(57) ABSTRACT

A method and system of testing an overspeed protection system of a turbomachine may include providing an overspeed protection system on a turbomachine having at least one shaft. The method may: determine whether a permissive or permissive(s) is satisfied; initiate an overspeed test; automatically adjusting the speed of a shaft; determining if the speed exceeds an overspeed trip value; and automatically disabling the automatic adjustment of the speed after the test is complete.

14 Claims, 5 Drawing Sheets

METHOD AND SYSTEM FOR TESTING THE OVERSPEED PROTECTION SYSTEM OF A TURBOMACHINE

BACKGROUND OF THE INVENTION

The present invention relates to a protection system of a turbomachine; and more particularly to a method and system for electronic overspeed protection on a turbomachine.

An overspeed condition occurs after the speed of a shaft on a turbomachine exceeds a specified range. During the overspeed condition, a turbomachine typically experiences severe mechanical and thermal stresses that can cause a catastrophic failure. Generally, the turbomachine is equipped protection systems, which attempt to minimize the effects of an overspeed condition. The governor system of the turbomachine generally serves as the primary line of protection system. Upon detecting an overspeed condition, the governor attempts to decrease the speed of the turbomachine. There may also be, generally, two independent secondary lines of protection: a) an overspeed protection system trip, typically set around 110% of operating shaft speed; and b) a emergency protection system trip, typically set around of operating shaft 113% speed. Typically, an overspeed protection system incorporates mechanical, electrical, and software components to safeguard the turbomachine.

Turbomachine operators periodically test the overspeed protection system to determine whether or not the system is functioning properly. There are a few common methods of testing an overspeed protection system.

One method utilizes a multi-channel frequency generator to simulate the speed of the turbomachine. Here, a simulated speed signal, on a single channel, is injected into the control system of the turbomachine. This simulated signal replaces the actual speed signal of the turbomachine. The simulated signal is raised to a speed where the overspeed protection system would trip the turbine. The aforementioned process is repeated with the remaining frequency generator channels.

Another method involves a turbomachine operator manually adjusting the actual turbine speed while the unit is operating. Here, prior to testing, the turbomachine is customarily operating in a full-speed-no-load (FSNL) condition. FSNL is a condition where the turbomachine is at a normal operating speed and not exporting energy to a load such as a generator, compressor, or the like. This method typically involves manually raising the speed until the unit trips. For example, during testing some turbomachine operators raise the speed to 110% of the normal operating speed; thereafter the overspeed system should trip the turbine on overspeed. Typically, the 110% overspeed trip set point may be changed at the direction of a turbine machine operator.

There are a few problems with the current methods of overspeed testing. Regarding the method that utilizes a multi-channel frequency generator, the overspeed protection system is not fully tested. As mentioned, that method only simulates the shaft speed. Hence, the actual shaft speed is not used during the testing. Thus, the method does not determine whether or not some of the mechanical and electrical components of the overspeed system are functioning correctly.

Regarding the method that involves manually adjusting the shaft speed, this method has a few problems. Manually adjusting the shaft speed introduces random and high thermal transients. Also, the method ends in a high-speed trip. Moreover, a trip at a speed well above the normal operating speed, such as 110%, can introduce large mechanical, electrical, and thermal stresses on the turbomachine components, which decreases the maintenance interval. After the trip, a re-start of a turbomachine is required. A re-start delays the export of energy, such as electricity to a utility grid, and a re-start also consumes fuel and other resources. These effects from the trip and subsequent re-start increase the operating expenses of the turbomachine. To avoid the potential problems associated with a high-speed trip, some turbomachine operators lower the overspeed trip set point. For example, the 110% set point is lowered to 100%, in order to reduce the high-speed trip effects. Here, however, the overspeed protection system is not fully tested since the turbomachine is not tripped at the default overspeed trip set point.

These problems, as discussed above, drive turbomachine operators to avoid overspeed testing.

For the foregoing reasons, there is a need for a method and system for testing an overspeed protection system that does not utilize a device that simulates the shaft speed nor cause a trip. The method should automatically adjust the shaft speed and not require a re-start.

BRIEF DESCRIPTION OF THE INVENTION

In accordance with an embodiment of the present invention, a method of testing an overspeed protection system of a turbomachine includes providing an overspeed protection system on a turbomachine, the turbomachine comprising at least one shaft; automatically adjusting the speed of the at least one shaft; determining whether the speed of the at least one shaft is a turbomachine overspeed trip value; and automatically adjusting the speed of the at least one shaft to about an operating speed.

In accordance with another embodiment of the present invention, a system for testing an overspeed protection of a turbomachine includes means for providing an overspeed protection system on a turbomachine, the turbomachine comprising at least one shaft; means for automatically adjusting the speed of at least one shaft; means for determining whether the speed of the at least one shaft is about an overspeed trip value; and means for automatically adjusting the speed of the at least one shaft to about an operating speed.

DETAILED DESCRIPTION OF THE INVENTION

Figure 1A:
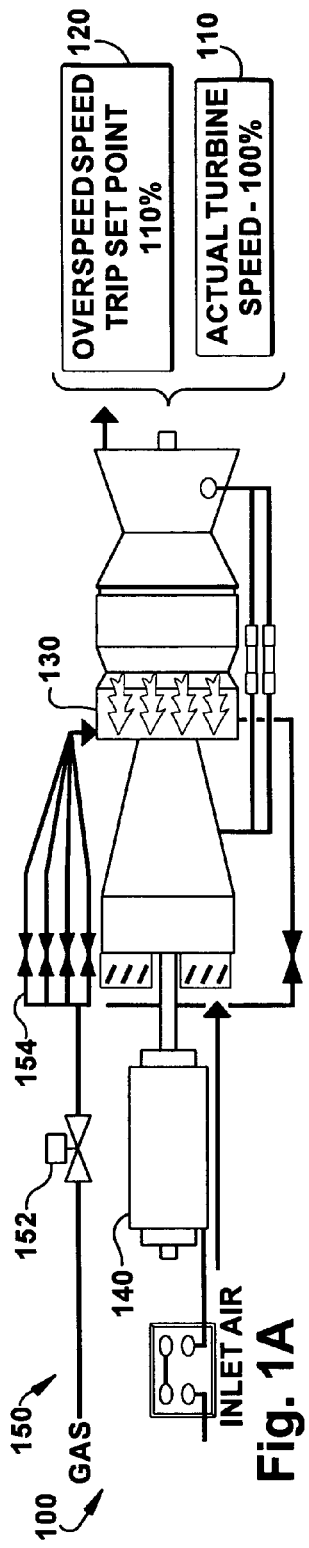
FIGS. 1A-1E (collectively FIG. 1) are schematics illustrating the environment in which an embodiment of the present invention operates.

As will be appreciated by one of ordinary skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The following detailed description of preferred embodiments refers to the accompanying drawings, which illustrate specific embodiments of the invention. Other embodiments having different structures and operations do not depart from the scope of the present invention.

An embodiment of the present invention takes the form of a software application and process that automatically tests the overspeed protection system of a turbomachine. The present invention can be applied to many forms of turbomachines including combustion gas turbines, steam turbines, or the like.

The present invention may include a biasing system or the like which adjusts the default set points of the overspeed protection system trip and the emergency protection system trip. The biasing system may allow the speed of the turbomachine to increase to the default overspeed trip set point, without tripping the turbomachine. This ensures that the overspeed trip system is tested at the default overspeed trip set point speed. Furthermore, the present invention may not disable the overspeed protection system or the emergency protection system. For example, during the overspeed test of the present invention, the biasing system may increase the emergency trip set point from 110% to 111% and the protection trip set point from 113% to 114%. Therefore, if the present invention were to malfunction, the turbomachine is still protected by those two secondary independent lines of protection.

The present invention may require that at least one test permissive is satisfied and maintained prior to the start of the overspeed test. These permissives may include a master protective trip state; a generator/driven load status; an operating permissive; an inlet guide vane position; and a stabilization permissive. Furthermore, each permissive may be required at a different period during the overspeed test. For example, an operating permissive may be required before the testing starts, whereas a stabilization permissive may be required during the testing.

FIGS. 1A-1E (collectively FIG. 1) are schematics illustrating the environment in which an embodiment of the present invention operates. FIG. 1 illustrates a combustion gas turbine (hereinafter turbine) 100 experiencing a test of the overspeed protection system in accordance with an embodiment of the present invention. FIG. 1 includes operational parameters of the turbine 100. These parameters include actual turbine speed 110 (as a percentage of normal operating speed); overspeed trip set point (as a percentage of normal operating speed) 120; flame detector 130; and generator output 140. FIG. 1 also illustrates a gas fuel system 150 having a stop/speed ratio valve 152, a plurality of gas control valves 154.

An embodiment of the present invention allows the user to manually abort the test, after which the actual turbine speed 110 will automatically return the turbine 100 to FSNL.

Referring specifically to FIG. 1A, which illustrates that the actual turbine speed 110 is 100%, the overspeed trip set point 120 is 110%, flame detector 130 indicating flame and the generator output 140 is 0. These parameters suggest that the turbine 100 is operating in a FSNL condition. After the testing permissive (s) is satisfied, the user may commence the overspeed test.

Figure 1B:
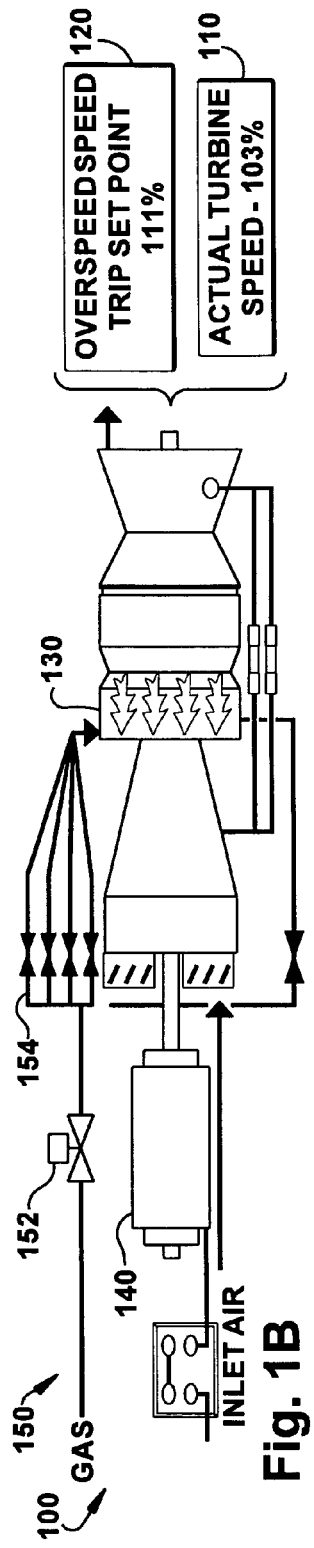

FIG. 1B illustrates that after the overspeed test has commenced the actual turbine speed 110 increased to 103% and the overspeed trip set point 120 is biased to 111%. The present invention automatically adjusts the speed of the turbine 100 during the overspeed test. The automatic speed adjustment of the present invention provides for a consistent rate of speed change during the overspeed test.

Figure 1C:
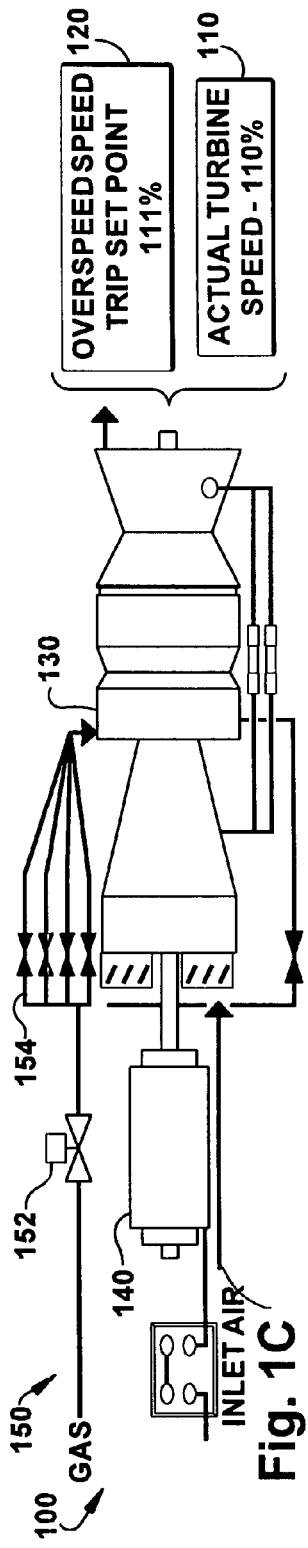
Figure 1D:
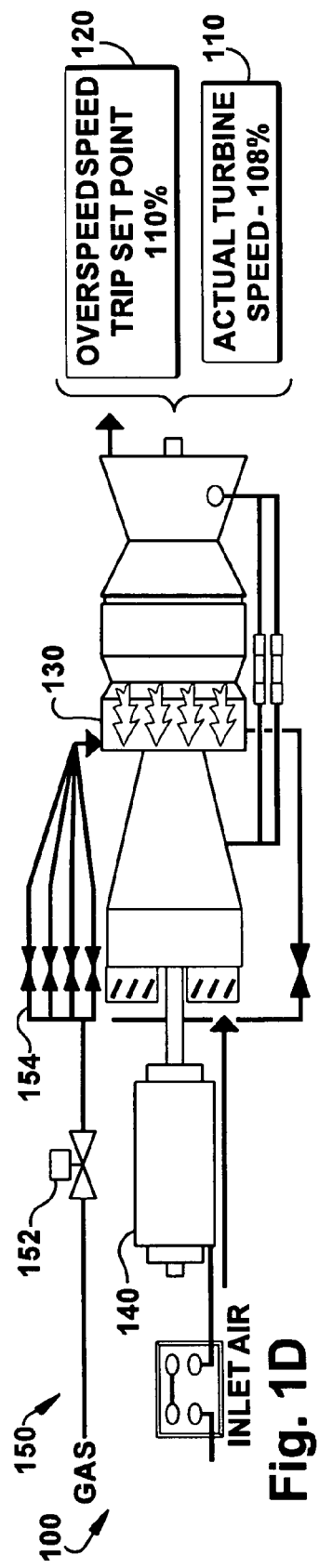
Figure 1E:
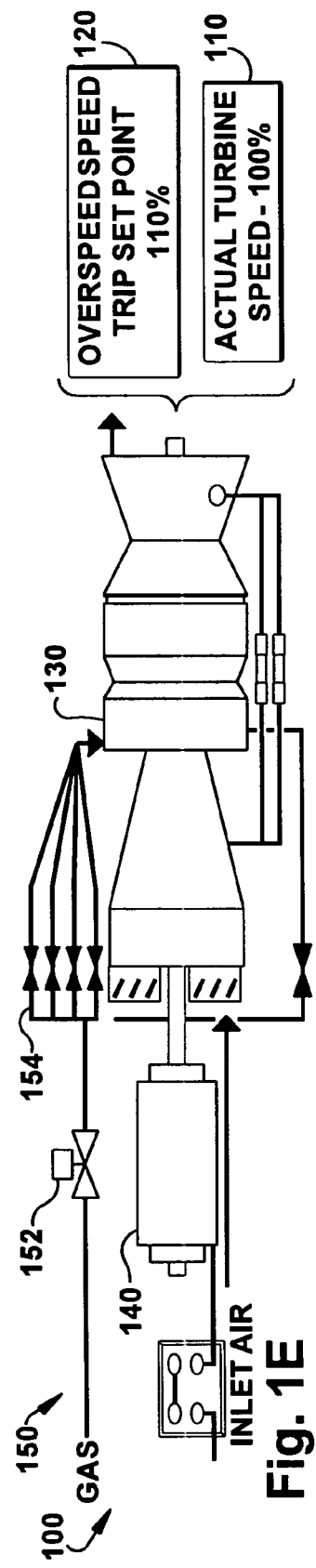

FIG. 1C illustrates the actual speed of the turbine 100 to be 110%, equal to that of the default overspeed trip setting. As discussed, the overspeed trip set point 120 is biased to 111%. The present invention does not trip the turbine 100 during the overspeed test when an overspeed condition is reached. An embodiment of the present invention may notify the user of the overspeed condition. As shown in FIG. 1D, the present invention automatically decreases the speed of the turbine 100 after the overspeed condition is reached. Here, the actual speed 110 has been automatically lowered to 108%. Furthermore, the present invention may remove the biasing of the overspeed trip after actual speed reaches the default overspeed trip setting. Here, the overspeed trip set point 120 is returned to the default value of 110%. An embodiment of the present invention may continue to automatically adjust the speed of the turbine 100 until FSNL is reached, thereby completing the test. Thereafter, a user may export energy to a load, as in FIG. 1E, which illustrates the turbine 100 and generator 140 synchronized and exporting 14 megawatts of power and 6.2 megavars to a utility grid.

Figure 2A:
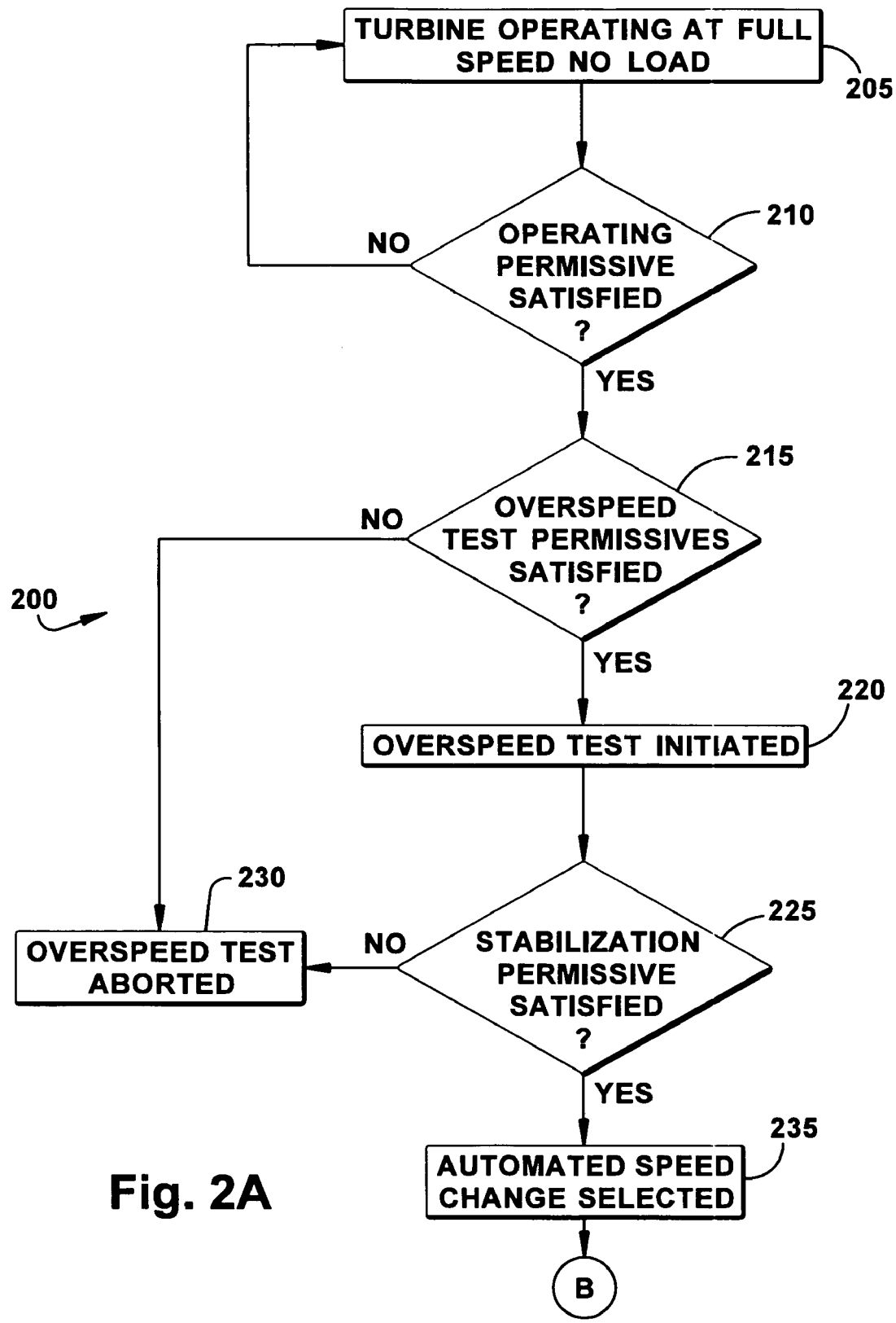
FIGS. 2A and 2B (collectively FIG. 2) are flowcharts illustrating an example of a method of testing an overspeed protection system in accordance with an embodiment of the present invention.
Figure 2B:
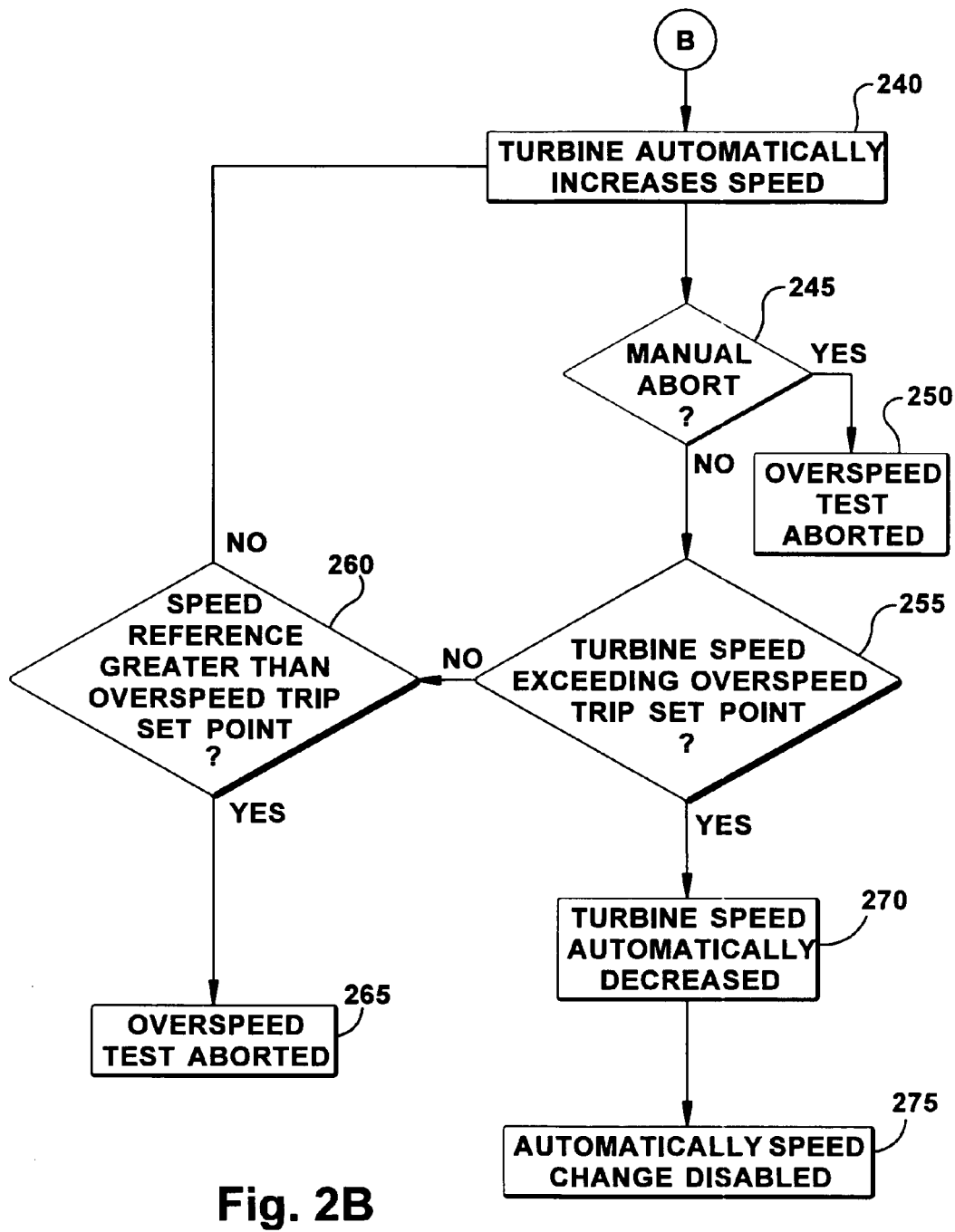

Referring now to FIGS. 2A and 2B (collectively FIG. 2), which are a flowchart illustrating the steps for a method 200 of testing an overspeed protection system of a turbine, in accordance with an embodiment of the present invention. In step 205, a turbine is operating at FSNL, which may be a preferable starting condition for an overspeed test. Typically, a turbine operates at FSNL when not exporting energy to an external load. For example, before synchronizing a generator to a utility grid, a turbine generally operates at FSNL. In step 210, the method 200 determines whether or not a operating permissive is satisfied. An embodiment of the present invention may allow the user to configure at least one operating permissive. The operating permissive may include a FSNL continuous operation time period; soak time, or the like requirement. For example, the permissive may require a longer turbine operation period for a new shaft. If the operating permissive is not satisfied, then the method 200 reverts to step 205; otherwise the method 200 proceeds step 215.

In step 215, the method 200 determines whether at least one overspeed test permissive is satisfied. Similar to step 210, an embodiment of the present invention may allow the user to define the overspeed test permissive or define a plurality of overspeed test permissives. For example, the overspeed test permissive may include: an inlet guide vane position; a compressor protection system status; and an inlet air system status, inlet bleed heat, or the like. If the overspeed test permissive is not satisfied, then the method 200 proceeds to step 230; otherwise the method 200 proceeds to step 220.

In step 230, the method 200 may automatically abort the overspeed test. After the test is aborted, the turbine operation automatically reverts to FSNL. A user may configure the method 200 to provide a notification that the test was aborted. The notification may be an alarm of varying forms such as, but not limited to, an audio signal, a graphic, or a text message.

The method 200 proceeds to step 220, where the overspeed test is initiated. A user may pre-configure the method 200 to automatically initiate the overspeed test after step 215 is satisfied. A user may desire this option if, for example, the operation of the turbine is conducted remotely. Alternatively, the method 200 may be pre-configured to require a user action to initiate the overspeed test. The user action may be, but is not limited to, selecting an "overspeed test initiate" button, or the like, on a display where the turbine is locally controlled.

The method 200 proceeds to step 225, which determines whether or not at least one stabilization permissive is satisfied. The stabilization permissive may ensure that the turbine is operating near a thermal steady state with minimal heat transients. The stabilization permissive may be in the form of a timer, or the like, which counts the turbine operating time. Similar to steps 210 and 215, an embodiment of the present invention may allow the user to define a stabilization permissive or a plurality of stabilization permissives. Furthermore, the stabilization permissive may vary among types and/or classes of turbines. If the stabilization test permissive is not satisfied, then the method 200 proceeds to step 230; otherwise the method 200 proceeds step 235.

In step 235, the method 200 selects an automatic speed change. An embodiment of the present invention may notify the user that the method 200 is ready for automatic speed. This notification may be, but is not limited to, an alarm and/or a prompt requiring a user action to proceed with the automatic speed increase. Alternatively, an embodiment of the present invention may be pre-configured to automatically select the automatic speed change.

The method 200 proceeds to step 240, where the speed of at least one shaft of turbine automatically increases. An embodiment of the present invention may vary the rate at which the speed increases, thereby allowing a user to minimize the thermal transients commonly associated with speed increases. The rate may vary depending on turbine class and operational environment. For example, an embodiment of the present invention may also allow the user to vary the rate during the overspeed testing to account for the momentum associated with the shaft and other mechanical components. Furthermore, a relatively faster rate may be used during at lower speeds and a slower rate used as the turbine nears the overspeed trip set point.

After the automatic speed increases commence, the method 200, in step 245, determines whether the user decides to manually abort the other speed test. A reason for aborting the overspeed test may include, but is not limited to, operational or safety concerns. For example, the higher shaft speeds may cause a vibration problem that requires the user to abort the test. If the user aborts the overspeed test, then the method 200 proceeds to step 250; otherwise the method 200 proceeds to step 255.

In step 250, the method 200 aborts the test. Similar to step 230, after the overspeed test is aborted, the turbine operation reverts to FSNL. A user may configure the method 200 to provide a notification that the overspeed test was aborted during step 240. The notification may be an alarm of varying forms such as, but not limited to, an audio signal, a graphic, or a text message.

The present invention may incorporate a control system, turbine controller, or the like; that operates the turbine. The turbine controller may include at least one processing system, commonly called a core, which registers the speed of the turbine. An embodiment of the present invention may include a turbine controller having at least two cores, an operation core, and a protection core, or the like. The method 200, in step 255, allows the user to pre-configure each core to register the turbine speed. This serves to verify that the turbine is experiencing an overspeed condition.

On a turbine, a protection system generally operates to rapidly stop the fuel flow to the combustion system, thereby extinguishing combustion. Data recording means are typically used to verify that the protection system components operated correctly during the overspeed test. The present invention may be integrated with an alarm system that notifies the user whether or not the protection system would have operated correctly in the event of a real overspeed condition.

In step 255, the method 200 determines whether or not the turbine speed exceeds the overspeed trip set point. In an embodiment of the present invention, if the operation core and protection core do not register that the turbine speed exceeds the overspeed trip set point, then the method 200 proceeds to step 260; otherwise the method 200 proceeds to step 270.

An embodiment of the present invention typically increases the speed of the turbine by first increasing a turbine speed reference. The turbine speed reference is converted to a fuel stroke reference, or the like, which eventually increases the speed of the turbine. In step 260, the method 200 determines whether or not the turbine controller is initiating a turbine speed reference greater than the overspeed trip set point. If the turbine speed reference is not greater than the overspeed trip set point, then the method 200 reverts back to step 240. Alternatively, if the turbine speed reference is greater than the overspeed trip set point, then the method 200 proceeds to step 265.

In step 265, the overspeed test is aborted to avoid a trip or a catastrophic failure that may be caused by a variety of reasons. One reason for a catastrophic failure involves the thermal growth rates, which vary between the rotating and stationary turbine components. Generally, as the turbine speed increases, there is an increase in the thermal expansion of the components. Moreover, relatively tight clearances exist between the rotating and stationary turbine components, which are often made of different materials. These clearances may decrease further as the rotating and stationary components grow during the overspeed testing. Hence, to avoid a catastrophic failure resulting from contact among rotating and stationary turbine components, the method 200, in step 265 may abort the overspeed speed testing if the turbine speed reference exceeds the overspeed trip set point, even though the turbine speed is registering below the overspeed trip set point.

In step 270, the method 200 automatically decreases the turbine speed. Similar to step 240, an embodiment of the present invention may vary the rate at which the speed decreases, thereby allowing a user to minimize the thermal transients commonly associated with speed decreases. For example, the rate may vary depending on turbine class and operational environment. An embodiment of the present invention may also allow the user to vary the rate of speed decrease. For example, a relatively faster rate may be used during at higher turbine speeds and a slower rate used as the turbine speed nears the normal operating speed.

The overspeed test of the present invention is complete when the turbine speed returns to the normal operating speed. In step 275, the method 200 disables the automatic speed changes after the turbine returns to FSNL.

While the present invention has been described with respect to a single shaft combustion turbine in FIGS. 2A and 2B, those skilled in the art will recognize that the features of the present invention may be equally applied to other forms of turbomachines, such as a multiple shaft combustion turbine, steam turbines and the like.

Figure 3:
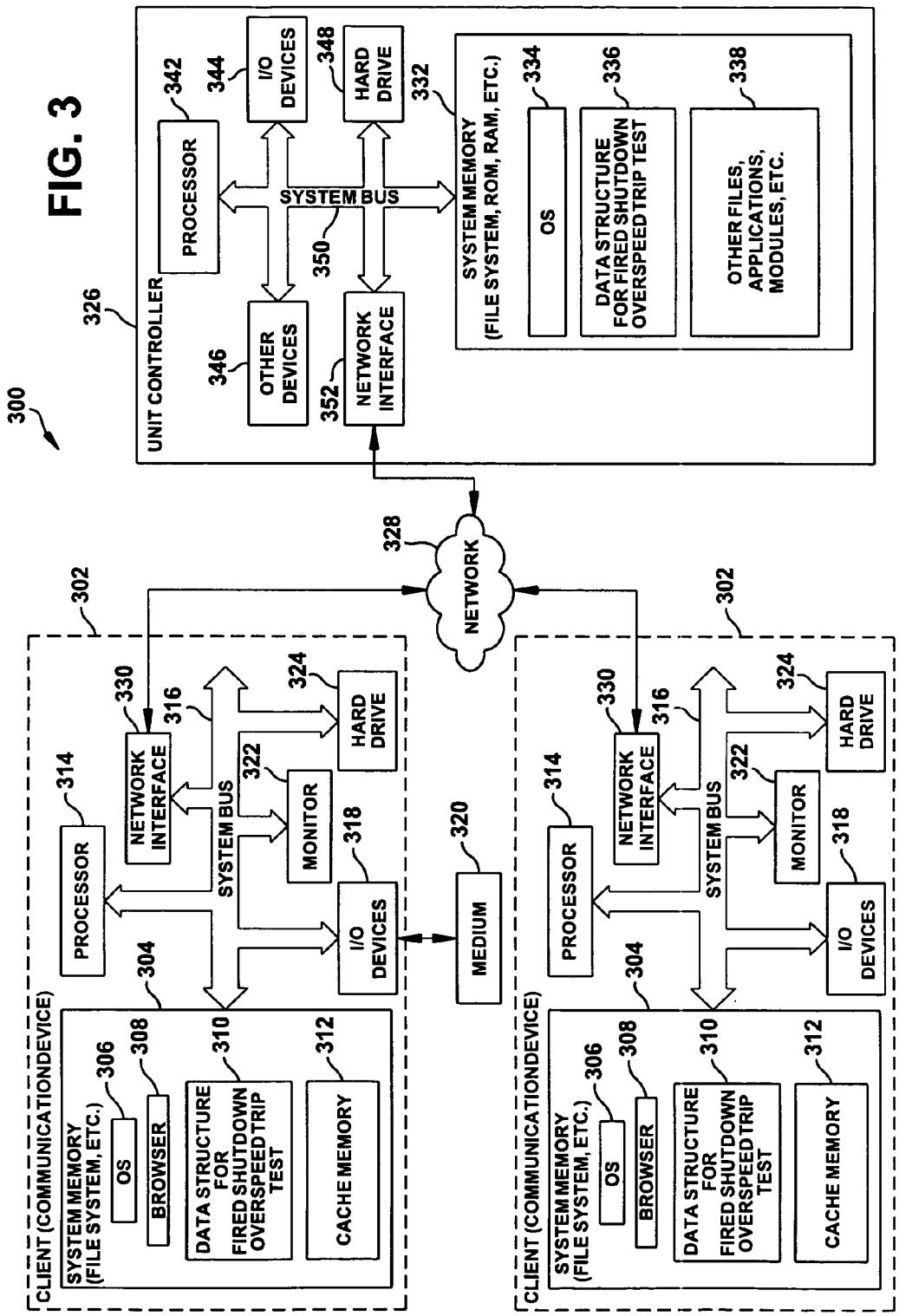
FIG. 3 is a block diagram of an exemplary system for testing an overspeed protection system in accordance with an embodiment of the present invention.

FIG. 3 is a block diagram of an exemplary system 300 to automatically test the overspeed protection system of a turbomachine in accordance with an embodiment of the present invention. The elements of the method 200 may be embodied in and performed by the system 300. The system 300 may include one or more user or client communication devices 302 or similar systems or devices (two are illustrated in FIG. 3). Each communication device 302 may be a computer system, a personal digital assistant, a cellular phone, or similar device capable of sending and receiving an electronic message.

The communication device 302 may include a system memory 304 or local file system. The system memory 304 may include a read only memory (ROM) and a random access memory (RAM). The ROM may include a basic input/output system (BIOS). The BIOS may contain basic routines that help to transfer information between elements or components of the communication device 302. The system memory 304 may contain an operating system 306 to control overall operation of the communication device 302. The system memory 304 may also include a browser 308 or web browser. The system memory 304 may also include data structures 310 or computer-executable code to automatically test the overspeed protection system of a turbomachine that may be similar or include elements of the method 200 in FIGS. 2A and 2B. The system memory 304 may further include a template cache memory 312, which may be used in conjunction with the method 200 in FIGS. 2A and 2B to automatically store data from the most recent test.

The communication device 302 may also include a processor or processing unit 314 to control operations of the other components of the communication device 302. The operating system 306, browser 308, data structures 310 may be operable on the processor 314. The processor 314 may be coupled to the memory system 304 and other components of the communication device 302 by a system bus 316.

The communication device 302 may also include multiple input devices, output devices or combination input/output devices 318. Each input/output device 318 may be coupled to the system bus 316 by an input/output interface (not shown in FIG. 3). The input and output devices or combination I/O devices 318 permit a user to operate and interface with the communication device 302 and to control operation of the browser 308 and data structures 310 to access, operate and control the software to automatically test the overspeed protection system of a turbomachine. The I/O devices 318 may include a keyboard and computer pointing device or the like to perform the operations discussed herein.

The I/O devices 318 may also include disk drives, optical, mechanical, magnetic, or infrared input/output devices, modems or the like. The I/O devices 318 may be used to access a medium 320. The medium 320 may contain, store, communicate or transport computer-readable or computer-executable instructions or other information for use by or in connection with a system, such as the communication devices 302.

The communication device 302 may also include or be connected to other devices, such as a display or monitor 322. The monitor 322 may be used to permit the user to interface with the communication device 302. The monitor 322 may present images, graphics, or the like, similar to the schematics illustrated in FIGS. 1A-1E, that may be generated by the data structures 310 for automatically testing the overspeed protection system of a turbomachine.

The communication device 302 may also include a hard disk drive 324. The hard drive 324 may be coupled to the system bus 316 by a hard drive interface (not shown in FIG. 3). The hard drive 324 may also form part of the local file system or system memory 304. Programs, software and data may be transferred and exchanged between the system memory 304 and the hard drive 324 for operation of the communication device 302.

The communication devices 302 may communicate with a remote server 326 and may access other servers or other communication devices similar to communication device 302 via a network 328. The system bus 316 may be coupled to the network 328 by a network interface 330. The network interface 330 may be a modem, Ethernet card, router, gateway or the like for coupling to the network 328. The coupling may be a wired connection or wireless. The network 328 may be the Internet, private network, an intranet or the like.

The server 326 may also include a system memory 332 that may include a file system, ROM, RAM and the like. The system memory 332 may include an operating system 334 similar to operating system 306 in communication devices 302. The system memory 332 may also include data structures 336 to automatically test the overspeed protection system of a turbomachine. The data structures 336 may include operations similar to those described with respect to the method 200 for automatically testing the overspeed protection system of a turbomachine. The server system memory 332 may also include other files 338, applications, modules and the like.

The server 326 may also include a processor 342 or a processing unit to control operation of other devices in the server 326. The server 326 may also include I/O device 344. The I/O devices 344 may be similar to I/O devices 318 of communication devices 302. The server 326 may further include other devices 346, such as a monitor or the like to provide an interface along with the I/O devices 344 to the server 326. The server 326 may also include a hard disk drive 348. A system bus 350 may connect the different components of the server 326. A network interface 352 may couple the server 326 to the network 328 via the system bus 350.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of testing an overspeed protection system of the turbomachine, the method comprising:
   providing an overspeed protection system on a turbomachine,
       the turbomachine comprising at least one shaft;
   automatically adjusting the speed of the at least one shaft;
   determining whether the speed of the at least one shaft is a turbomachine overspeed trip value; and
   automatically adjusting the speed of the at least one shaft to about an operating speed after automatically adjusting the speed of the at least one shaft and determining whether the speed of the at least one shaft is a turbomachine overspeed trip value.

2. The method of claim 1, wherein the turbomachine is a combustion turbine and the method further comprises:
   initiating an overspeed test;
   determining whether at least one predetermined stabilization permissive is satisfied, otherwise aborting the test;
   automatically adjusting the speed of at least one shaft;
   determining whether the speed of the at least one shaft exceeds an overspeed trip value, otherwise
       determining whether a shaft speed reference exceeds the overspeed trip value, otherwise aborting the test; and
   automatically disabling the automatic adjustment of the speed of the at least one shaft.

3. The method of claim 2, wherein aborting the test adjusts the speed of the at least one shaft to an operating speed.

4. The method of claim 3 further comprising determining whether at least one predetermined operating permissive is satisfied.

5. The method of claim 4 further comprising determining whether at least one predetermined overspeed test permissive is satisfied.

6. The method of claim 5 further comprising biasing at least one preexisting overspeed trip set point.

7. A system for testing an overspeed protection of a turbomachine, the system comprising:
   means for providing an overspeed protection system on a turbomachine, the turbomachine comprising at least one shaft;
   means for automatically adjusting the speed of at least one shaft;
   means for determining whether the speed of the at least one shaft is about an overspeed trip value; and
   means for automatically adjusting the speed of the at least one shaft to about an operating speed after automatically adjusting the speed of the at least one shaft and determining whether the speed of the at least one shaft is a turbomachine overspeed trip value.

8. The system of claim 7, wherein the turbomachine is a combustion turbine and the system further comprises:
   means for initiating an overspeed test;
   means for determining whether at least one predetermined stabilization permissive is satisfied, otherwise aborting the test;
   means automatically adjusting the speed of at least one shaft;
   means for determining whether the speed of the at least one shaft exceeds an overspeed trip value, otherwise
       determining whether a shaft speed reference exceeds the overspeed trip value, otherwise aborting the test; and
   means for automatically disabling the automatic adjustment of the speed of the at least one shaft.

9. The system of claim 8, wherein aborting the test adjusts the speed of the shaft to a operating speed.

10. The system of claim 9 further comprising means for determining whether at least one predetermined operating permissive is satisfied.

11. The system of claim 10 further comprising means for determining whether at least one predetermined testing permissive is satisfied.

12. The system of claim 10 further comprising means for biasing at least one preexisting overspeed trip set point.

13. A method of testing an overspeed protection system of a turbomachine, the method comprising:
   providing an overspeed protection system on a turbomachine,
      the turbomachine comprising at least one shaft;
   determining whether at least one predetermined operating permissive is satisfied;
   determining whether at least one predetermined overspeed test permissive is satisfied;
   initiating an overspeed test;
   determining whether at least one predetermined stabilization permissive is satisfied, otherwise aborting the test;
   automatically adjusting the speed of at least one shaft;
   determining whether the speed of the at least one shaft exceeds an overspeed trip value, otherwise
      determining whether a shaft speed reference exceeds the overspeed trip value, otherwise aborting the test; and
   automatically disabling the automatic adjustment of the speed of the at least one shaft.

14. A system for testing an overspeed protection of a turbomachine, the system comprising:
   means for providing an overspeed protection system on a turbomachine, the turbomachine comprising at least one shaft;
   means for determining whether at least one predetermined operating permissive is satisfied;
   means for determining whether at least one predetermined testing permissive is satisfied;
   means for initiating an overspeed test;
   means for determining whether at least one predetermined stabilization permissive is satisfied, otherwise aborting the test;
   means automatically adjusting the speed of at least one shaft;
   means for determining whether the speed of the at least one shaft exceeds an overspeed trip value, otherwise
      determining whether a shaft speed reference exceeds the overspeed trip value, otherwise aborting the test; and
   means for automatically disabling the automatic adjustment of the speed of the at least one shaft.

* * * * *